Sept. 4, 1956  R. R. HILL  2,761,267
SPRING CULTIVATOR SHANK
Filed Sept. 22, 1952
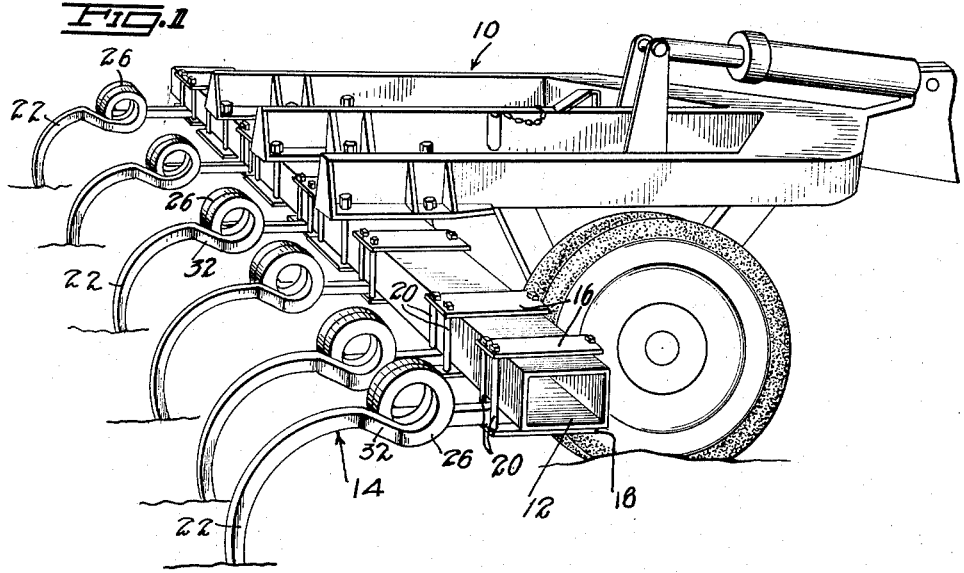
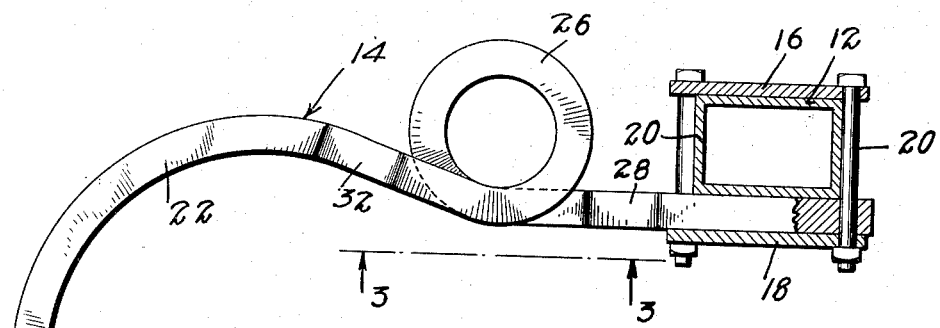
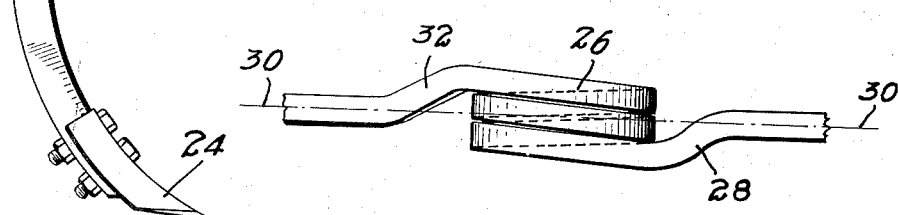
INVENTOR.
ROY R. HILL
BY
*Lyon & Lyon*
ATTORNEYS

United States Patent Office 2,761,267
Patented Sept. 4, 1956

2,761,267

SPRING CULTIVATOR SHANK

Roy R. Hill, El Monte, Calif., assignor to U. S. Spring & Bumper Co., Los Angeles, Calif., a corporation of California Application September 22, 1952, Serial No. 310,838

1 Claim. (Cl. 55—36)

This invention relates to a spring cultivator shank.

In prior types of cultivator shanks a side draft or thrust is present, necessitating use of two types of cultivator tools, one of which has a left-handed thrust and the other a right-handed thrust to balance each other.

It is therefore an object of this invention to eliminate this side draft so that only one type of culivator tool is utilized.

It is a further object of this invention to provide a spring cultivator shank wherein the tendency to open or twist the coils is greatly reduced, thereby lengthening the life of the cultivating tool and eliminating injury thereto.

Other objects and advantages will be readily apparent from the following description:

In the drawings:

Figure 1 is a perspective view of spring cultivator tools secured to the tool bar.

Figure 2 is a side elevation partially in section of the cultivator tool.

Figure 3 is a view taken along the line 3—3 of Figure 2.

The frame 10 has suitably mounted thereon a tool bar 12 and is adapted to be dragged by a tractor or the like.

The cultivating tool, generally designated 14, is clamped upon the tool bar by means of metal plates 16 and 18 which are urged together by bolts 20, locking the shank of the cultivating tool to the tool bar.

This invention is directed to the cultivating tool and the frame, and means for connecting the tools to the tool bar may be of any suitable type.

The cultivating tool has a shank 22 to which a shear 24 is suitably attached as by bolts. The shank is formed of spring steel and has formed therein coils 26 which provide resiliency to the tool, avoiding injuring or breaking the tool upon striking a rock or similar obstruction during cultivating.

As best seen in Figure 3, the shank is provided with an offset 28 prior to formation of the coils so that the first coil is outside the center line 30 of the shank lying in a plane normal to the plane defined by the offset 28 and the axis of the shank. After formation of the coils 26, a second offset 32 is provided so that the remaining portion of the shank lies along the center line 30 of the tool. The extent of offsets 28 and 32 is determined by the number of coils utilized. When the spring cultivator shanks are formed in this manner, the pull is along the center line and there is no sideward drag created by the tool so that only one type of tool need be used and the twisting and opening of the coils are greatly reduced or eliminated.

While what hereinbefore has been described is the preferred embodiment, it is readily apparent that alterations and modifications can be resorted to without departing from the scope of this invention, and such alterations and modifications are intended to be within the scope of the following claim.

I claim:

In a cultivating tool of the type described, a shank member comprising: a continuous bar, said bar being formed to define a substantially straight attaching portion having a lateral offset at an end thereof, at least one coil formed in said bar and joined to said lateral offset at one side of the centerline of said attaching portion and in tangent relation to said lateral offset, said coil lying in a plane normal to the plane defined by said attaching portion and said lateral offset and terminating on the other side of said centerline opposite said lateral offset, a second offset extending tangentially from the termination of said coil back to said centerline, a working portion of said shank joined to said second offset and extending therefrom in substantial alignment with said attaching portion, and means fixedly mounting said attaching portion to a support with all portions of said coil free of contact with said support.

References Cited in the file of this patent

UNITED STATES PATENTS

| | | |
|---|---|---|
| 329,371 | Davis et al. | Oct. 27, 1885 |
| 448,332 | Funk et al. | Mar. 17, 1891 |
| 665,226 | Johnston | Jan. 1, 1901 |
| 1,145,963 | Bame | July 13, 1915 |

FOREIGN PATENTS

| | | |
|---|---|---|
| 94,800 | Austria | Nov. 10, 1923 |